(12) United States Patent
Yan et al.

(10) Patent No.: US 7,227,686 B1
(45) Date of Patent: Jun. 5, 2007

(54) TUNABLE PMD EMULATORS AND COMPENSATORS

(75) Inventors: Lianshan Yan, Los Angeles, CA (US); X. Steve Yao, Diamond Bar, CA (US)

(73) Assignee: General Photonics Corporation, Chino, CA (US)

(*) Notice: Subject to any disclaimer, the term of this patent is extended or adjusted under 35 U.S.C. 154(b) by 0 days.

(21) Appl. No.: 11/075,643

(22) Filed: Mar. 8, 2005

Related U.S. Application Data

(62) Division of application No. 10/350,283, filed on Jan. 22, 2003, now abandoned.

(60) Provisional application No. 60/439,228, filed on Jan. 10, 2003, provisional application No. 60/351,085, filed on Jan. 22, 2002.

(51) Int. Cl.
G02B 27/28 (2006.01)

(52) U.S. Cl. ............... 359/501; 385/11; 398/147; 398/152; 398/159; 398/161; 359/497; 359/499

(58) Field of Classification Search ............... 359/497, 359/499, 501, 280–284; 385/11; 398/147, 398/152, 158, 161
See application file for complete search history.

(56) References Cited

U.S. PATENT DOCUMENTS

| | | | |
|---|---|---|---|
| 4,389,090 A | 6/1983 | LeFevre | |
| 5,004,312 A * | 4/1991 | Shimizu | 385/1 |
| 5,111,322 A | 5/1992 | Bergano et al. | |
| 5,473,457 A | 12/1995 | Ono | |
| 5,611,005 A | 3/1997 | Heismann et al. | |
| 5,930,414 A | 7/1999 | Fishman et al. | |
| 5,978,125 A | 11/1999 | Yao | |
| 6,252,711 B1 * | 6/2001 | Damask et al. | 359/498 |
| 6,377,719 B1 | 4/2002 | Damask | |
| 6,493,474 B1 | 12/2002 | Yao | |
| 6,542,650 B2 | 4/2003 | Khosravani et al. | |
| 6,546,159 B1 | 4/2003 | Peng et al. | |
| 6,577,445 B1 * | 6/2003 | Damask | 359/497 |
| 6,842,283 B2 * | 1/2005 | Savory et al. | 359/499 |
| 6,847,484 B2 * | 1/2005 | Damask et al. | 359/497 |
| 6,867,918 B2 * | 3/2005 | Damask | 359/497 |
| 6,891,674 B2 * | 5/2005 | Damask | 359/497 |
| 2002/0015547 A1 | 2/2002 | Patel | |
| 2002/0075477 A1 * | 6/2002 | Yu et al. | 356/73.1 |
| 2003/0076588 A1 | 4/2003 | Savory, et al. | |

* cited by examiner

Primary Examiner—Mark A. Robinson
Assistant Examiner—Lee Fineman
(74) Attorney, Agent, or Firm—Fish & Richardson P.C.

(57) ABSTRACT

Tunable PMD emulators and compensators for producing different PMD profiles with an adjustable average DGD value.

7 Claims, 14 Drawing Sheets

DGD (ps)

Normalized 2$^{nd}$ PMD (ps$^2$)

TUNABLE PMD EMULATORS AND COMPENSATORS

RELATED PATENT APPLICATIONS

This application is a divisional (and claims the benefit of priority under 35 USC 121) of U.S. application Ser. No. 10/350,283, filed Jan. 22, 2003 now abandoned, which claims priority to U.S. Provisional Application Nos. 60/351,085 entitled "All-Order Polarization Mode Dispersion Emulator" and filed on Jan. 22, 2002, and 60/439,228 entitled "PMD Emulator with Multi-Section Variable DGD Elements" and filed on Jan. 10, 2003, the entire disclosure of the prior applications are incorporated herein by reference as part of this application.

BACKGROUND

This application relates to optical polarization of light and polarization-mode dispersion in optical media, and more specifically, to techniques and systems for emulating and compensating polarization-mode dispersion in optical media such as optical fibers.

Various optical media are birefringent by exhibiting different refractive indices for different polarizations of light. Fibers, for example, may be birefringent and the axis of birefringence of a fiber may change with time, often randomly with the fluctuations in the operating conditions such as stresses or temperatures. Accordingly, the polarization of an optical signal, which may be represented by two polarization components along two orthogonal principal polarization states, can vary and thus be significantly distorted after propagation. This effect is called polarization-mode dispersion ("PMD") and the first-order of PMD may be characterized by the average differential group delay ("DGD") between the two principal states of polarization.

In general, effects of this polarization-mode dispersion are undesirable in various applications including optical fiber communication systems. Hence, it is desirable to characterize PMD effects and provide means to mitigate the PMD effects. One way of characterizing PMD effects is to use a PMD emulator to emulate actual PMD in a system of interest, such as a fiber system. For example, such a PMD emulator may be used to test a PMD compensator prior to actual deployment of the compensator.

SUMMARY

One implementation of a device of this application includes birefringent sections cascaded in series to form an optical path and configured to produce their respective differential group delays, tunable polarization devices each coupled between two adjacent birefringent sections to rotate polarization of light transmitting therethrough. At least one tunable polarization device coupled between a first birefringent section and a second birefringent section is controlled in responsive to a switch control signal to switch polarization of light between a first state and a second state. In the first state, a first principal polarization of the light along a slow principal axis and a second principal polarization of the light along a fast principal axis of the first birefringent section are aligned with slow and fast principal axes of the second birefringent section, respectively. In the second state, a first principal polarization of the light along a slow principal axis and a second principal polarization of the light along a fast principal axis of the first birefringent section are aligned with fast and slow principal axes of the second birefringent section, respectively. In addition, a control unit is coupled to control operations of the tunable polarization devices to produce a polarization-mode dispersion profile in light transmitting through the optical path.

In another implementation, a device uses variable DGD sections cascaded in series to form an optical path. Each variable DGD section is operable to produce a variable differential group delay and is configured to include cascaded birefringent segments of different lengths, and tunable polarization elements each coupled between two adjacent birefringent segments to control polarization of light. Polarization controllers are coupled in the optical path where each polarization controller is coupled between two adjacent variable DGD sections to control polarization of light transmitting therethrough. The device under this implementation further includes a control unit coupled to control the variable DGD sections and the polarization controllers to produce a polarization-mode dispersion profile in light transmitting through the optical path.

The devices of this application may be used in various application, including but not limited to, emulating PMD in real fibers, compensation for PMD in optical signals, and performing importance sampling in PMD emulations.

These and other implementations, features and variations of various devices and methods are now described in greater detail with respect to the drawings, the detailed description, and the claims.

The following are examples of various specific implementations described in this application:

1. A device, comprising:
   a plurality of birefringent sections cascaded in series to form an optical path and configured to produce differential group delays;
   a plurality of tunable polarization devices each coupled between two adjacent birefringent sections to rotate polarization of light transmitting therethrough;
   at least one polarization switch coupled between a first birefringent section and a second birefringent section responsive to a switch control signal to switch polarization of light between a first state where a first principal polarization of the light along a slow principal axis and a second principal polarization of the light along a fast principal axis of said first birefringent section are aligned with slow and fast principal axes of said second birefringent section, respectively, and a second state where a first principal polarization of the light along a slow principal axis and a second principal polarization of the light along a fast principal axis of said first birefringent section are aligned with fast and slow principal axes of said second birefringent section, respectively; and
   a control unit coupled to control operations of said tunable polarization devices and said polarization switch to produce a polarization-mode dispersion profile in light transmitting through said optical path.

2. The device as in the above item number 1, wherein each of said tunable polarization devices and said polarization switch is configured to operate without a moving component.

3. The device as in the above item number 2, wherein each of said tunable polarization devices and said polarization switch includes a magneto-optic device.

4. The device as in the above item number 1, further comprising a feedback mechanism to control said tunable polarization devices and said polarization switch in response to an output state of polarization in light exiting said optical path so that said polarization-mode dispersion profile is dynamically adjusted.

5. A device, comprising:
a plurality of birefringent sections cascaded in series to form an optical path and configured to produce differential group delays;
a plurality of tunable polarization devices each coupled between two adjacent birefringent sections to rotate polarization of light transmitting therethrough, wherein at least one tunable polarization device coupled between a first birefringent section and a second birefringent section is controlled in responsive to a switch control signal to switch polarization of light between a first state where a first principal polarization of the light along a slow principal axis and a second principal polarization of the light along a fast principal axis of said first birefringent section are aligned with slow and fast principal axes of said second birefringent section, respectively, and a second state where a first principal polarization of the light along a slow principal axis and a second principal polarization of the light along a fast principal axis of said first birefringent section are aligned with fast and slow principal axes of said second birefringent section, respectively; and
a control unit coupled to control operations of said tunable polarization devices to produce a polarization-mode dispersion profile in light transmitting through said optical path.

6. The device as in the above item number 5, wherein said control unit controls a different tunable polarization device to switch polarization of light to either of said first and said second states when a different polarization-mode dispersion profile is produced.

7. A method, comprising:
causing a plurality of birefringent sections to be cascaded in series to form an optical path, where said birefringent sections are operable to produce differential group delays;
causing each of a plurality of tunable polarization devices to be coupled between two adjacent birefringent sections to rotate polarization of light transmitting therethrough;
causing at least one selected tunable polarization device coupled between a first birefringent section and a second birefringent section to respond as a polarization switch to a switch control signal to switch polarization of light between a first state where a first principal polarization of the light along a slow principal axis and a second principal polarization of the light along a fast principal axis of said first birefringent section are aligned with slow and fast principal axes of said second birefringent section, respectively, and a second state where a first principal polarization of the light along a slow principal axis and a second principal polarization of the light along a fast principal axis of said first birefringent section are aligned with fast and slow principal axes of said second birefringent section, respectively; and
causing said tunable polarization devices including said selected tunable polarization device to operate collectively to produce a polarization-mode dispersion profile.

8. The method as in the above item number 7, further comprising causing at least one different selected tunable polarization device to operate as a polarization switch when a different polarization-mode dispersion profile is produced.

9. The method as in the above item number 8, further comprising: in producing said different polarization-mode dispersion profile, controlling said selected tunable polarization device to not operate as an optical switch and to operate to rotate polarization of light transmitting therethrough at an angle between angles for said first and said second states.

10. A device, comprising:
a plurality of variable DGD sections cascaded in series to form an optical path, each variable DGD section operable to produce a variable differential group delay and configured to comprise:
a plurality of cascaded birefringent segments of different lengths, and
a plurality of tunable polarization elements each coupled between two adjacent birefringent segments to control polarization of light;
a plurality of polarization controllers each coupled between two adjacent variable DGD sections to control polarization of light transmitting therethrough; and
a control unit coupled to control said variable DGD sections and said polarization controllers to produce a polarization-mode dispersion profile in light transmitting through said optical path.

11. The device as in the above item number 10, further comprising:
an in-line polarization monitor coupled between each polarization controller and an immediate adjacent variable DGD section to measure a state of polarization of output light from said each polarization controller; and
a feedback control loop coupled between said in-line polarization monitor and said each polarization controller to stabilize output light at a desired state of polarization.

12. The device as in the above item number 10, wherein each tunable polarization element is a polarization rotator.

13. The device as in the above item number 10, wherein each tunable polarization element between a first birefringent segment and a second birefringent segment is a polarization switch which is responsive to a switch control signal to switch polarization of light between a first state where a first principal polarization of light along a slow principal axis and a second principal polarization of the light along a fast principal axis of said first birefringent segment are aligned with slow and fast principal axes of said second birefringent segment, respectively, and a second state where a first principal polarization of the light along a slow principal axis and a second principal polarization of the light along a fast principal axis of said first birefringent segment are aligned with fast and slow principal axes of said second birefringent segment, respectively.

14. The device as in the above item number 10, wherein said birefringent segments have lengths that are different from one another by at least a factor of 2.

15. The device as in the above item number 10, wherein each polarization controller includes a plurality of tunable fiber squeezers coupled to different positions along a fiber.

16. The device as in the above item number 10, wherein said control unit is configured to perform importance sampling for emulating PMD states in a real fiber.

BRIEF DESCRIPTION OF THE DRAWINGS

FIGS. 14A and 14B illustrate importance sampling results for 1000 uniformly distributed DGDs (0 to 45 ps) applied to each section in the device in FIG. 13, wherein FIG. 14A shows measured output pdf (note several values at large DGDs are generated) and FIG. 14B shows the pdf after renormalizing the data to obtain a Maxwellian distribution with $<\tau>=15$ ps (points down to $10^{-24}$ are generated with only 1000 samples and the inset shows the linear scale).

FIGS. 15A and 15B show the 2nd-order PMD pdf for the importance sampling experiment described in FIGS. 14A and 14B, wherein FIG. 15A shows the measured output pdf and FIG. 15B shows the pdf after renormalizing the data (the 3-section emulator produces a 2nd-order pdf with the correct shape, but a slightly lower average than that of a real fiber because of the small number of sections).

FIGS. 16A, 16B, and 16C show the multiple importance sampling results, wherein FIG. 16A shows the three DGD distributions applied to each section (840 samples/distribution), FIG. 16B shows the resulting DGD distribution showing that each pdf generates samples in different regions to cover the entire Maxwellian, and FIG. 16C shows the resulting 2nd-order PMD pdf (the insets show the pdfs on a linear scale where it is evident that better coverage of lower values is achieved in comparison to the case shown in FIGS. 14A–15B).

DETAILED DESCRIPTION

The PMD emulators and compensators of this application include multiple birefringent sections for transmitting light and tunable optical rotators or polarization controllers coupled between two adjacent birefringent sections. In one implementation, each of the birefringent sections has a fixed DGD and at least one optical polarization switch is coupled between two adjacent birefringent sections to switch the relative orientation between the principal axes of the sections at 0 degree to add the DGD values of the sections, and at 90 degrees to subtract the DGD values of the sections. The polarization switch and other polarization rotators or controllers are tuned to emulate a desired PMD characteristics. In another implementation, each birefringent section is configured to have a tunable DGD value and the a polarization controller is coupled between two adjacent sections. The DGD value of each section and the polarization controllers are tuned to emulate the desired PMD characteristics.

Such devices can operate to produce tunable, different PMD statistics and tunable, different averaged DGD values for different PMD statistics. In addition, such devices may be configured to be programmable with high stability and repeatability. Notably, such devices may be used to perform importance sampling in PMD emulations.

Figure 1:
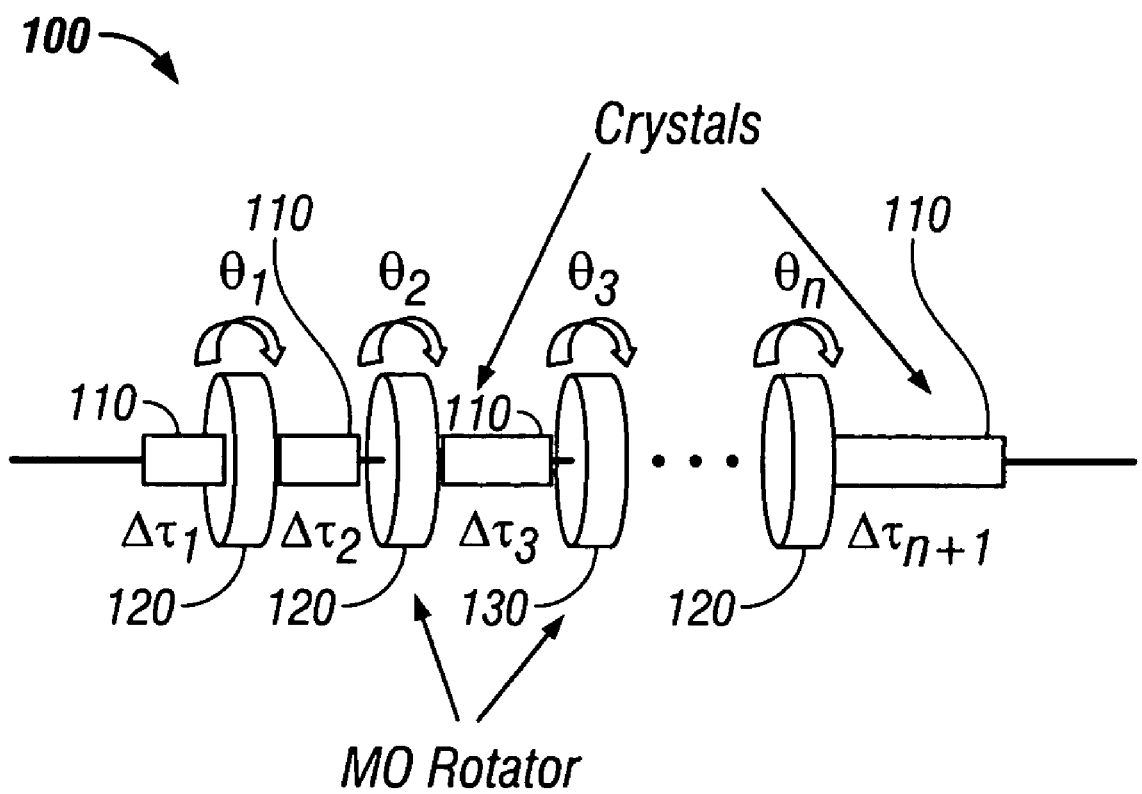
FIG. 1 shows one implementation of a PMD emulator with fixed birefringent sections cascaded to form an optical path.

FIG. 1 shows one implementation of an all-order PMD emulator 100 with fixed birefringent sections 110 along an optical path. The birefringent sections 110 may be implemented by using a suitable birefringent material, such as birefringent crystals and polarization-maintaining ("PM") fibers. Different birefringent sections 110 are configured to produce fixed and DGD values, $\Delta\tau_i$. Different DGD sections 110 may have different DGD values, or some may have different DGD values while others have the same DGD values, or all DGD sections 110 may have the same DGD values. Such DGD values for different sections 110 may be optimized for specific applications. When the DGD values of the different sections 110 are different, the birefringent sections 110 may be arranged in a number of configurations, including their DGD values increase or decrease from the input side to the output side. Tunable polarization rotators 120 and at least one optical polarization switch 130 are used to interconnect the fixed birefringent sections 110. Each rotator 120 is operable to rotate the polarization of received light by an adjustable angle. The switch 130, however, operates to switch the polarization of received light between a first state where the slow and fast principal axes of the preceding section are respectively aligned with the slow and fast principal axes of the succeeding section, and a second state where the slow and fast principal axes of the preceding section are respectively aligned with the fast and slow principal axes of the succeeding section. When the switch 130 is set to the first state, the fixed DGD values of the two connected adjacent sections 110 are added; in the second state, the fixed DGD values of the connected two adjacent sections 110 are subtracted. Hence, tis switching operation changes the total DGD value of the two adjacent sections and thus the averaged DGD value of a particular PMD statistics. This controllable switching operation of the switch 130 and the controllable rotating operation of other rotators 120 are combined to tune the generated PMD profile for emulating any desired PMD effects.

Figure 2:
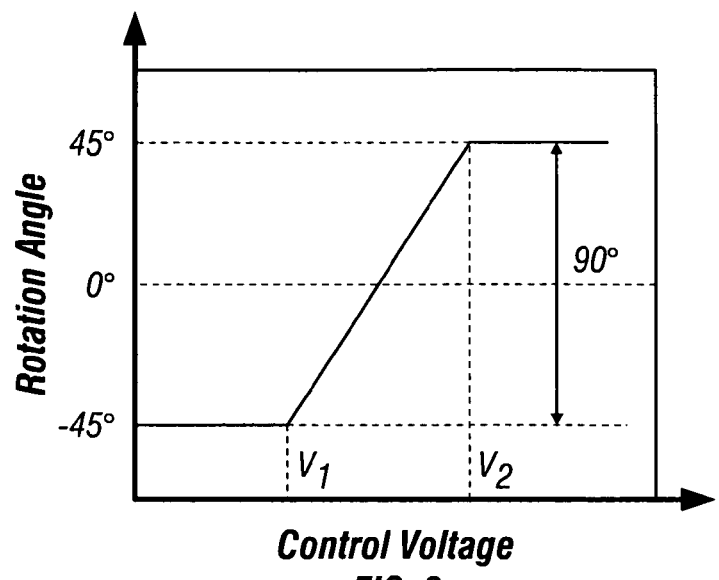
FIG. 2 illustrates exemplary modes of operation of a magneto-optic polarization rotators for polarization rotation and polarization switching.

The switch 130 and the rotators 120 may be designed to eliminate all moving parts and to rotate the polarization in response to a control signal. For example, magnetooptic (MO) polarization rotators may be used to rotate the polarization in response to an external control voltage applied to the MO element. Such a MO device has no moving parts and hence eliminates various technical shortcomings associated with devices with moving parts, such as durability, repeatability, tear and wear issues. The typical relationship between the applied voltage (V) and the rotation angle (θ) of MO polarization rotators 120 is shown in FIG. 2. Within a selected voltage range from $V_1$ to $V_2$, the rotation angle of the MO rotator may be a linear function of the applied voltage V. Beyond this voltage range, the rotation angle is fixed with either −45 or +45 degrees. This operating feature of the MO rotators 120 allows for small rotation angles by varying the control voltages with small steps between $V_1$ and $V_2$. Notably, the same MO device used for the rotators 120 may be controlled to operate as the switch 130, where the input polarization state can be either switched along the slow or fast axes of the birefringent sections by changing the control voltages either from a valve less than $V_1$ to a value greater than $V_2$ or vice versa.

In order to emulate higher-order PMD effects, the control voltages on the MO rotators 120 may be varied with a given angle step and thus the polarization coupling between different birefringent sections 110 can change accordingly. This operation allows for different PMD profile samples to be obtained. Since the fixed lengths of the birefringent sections 110 are designed according to the PMD statistics, using proper control, the desired PMD distribution can be achieved within a number of samples.

One or more optical polarization switches 130 are used to tune the average PMD value in the output of the emulator 100. As stated above, the DGD values of two adjacent sections 110 connected by the switch 130 can either add together or cancel each other. The switch 130 in effect operates to combine two adjacent birefringent sections 110 into a single birefringent section with a fixed DGD value at either the sum of the DGD values or the difference of the DGD values. Hence, the total configuration of the emulator 100 can be changed to a new configuration that has a different effective number of birefringent sections 110 with different DGD values based on how the voltages to the MO devices are controlled. Under this design, an optical rotator 120 in one configuration may be controlled as an optical switch 130 in another configuration and the number of optical switches 130 and the location of each switch 130 may be adjusted to achieve a desired configuration of the rotators 120 and the switches 130. The average DGD value of the emulator 100 may also be changed accordingly. At a given configuration for the optical switch or switches 130 for a fixed average PMD value, rotating of the other rotators with small angles by voltages within the range from $V_1$ to $V_2$ can change the PMD statistics to different profiles with the same fixed average PMD value. These features of the emulator 100 allow for flexible and diversified implementation of the emulator 100 in various applications.

Several emulator configurations based on the design in FIG. 1 and the above features have been tested to illustrate the effectiveness and performance of the design. The tested emulator configurations described here are based on the same physical device but with different control configurations on the MO devices. More specifically, a total of 16 pieces of birefringent crystals as the sections 110 are interconnected with 15 MO polarization rotating devices. The lengths of the birefringent crystals are arranged in a binary power series, increasing by a factor of 2 for each section. The normalized DGD values of the crystals are 1, 2, 4, 8, 16, and 32. The 16 crystals are arranged in the following configuration identified by their normalized DGD values:

1, 2, 4, 8, 16, 16, 8, 4, 2, 1, 1, 2, 4, 8, 16, 32, where some sections have the same DGD values and other sections have different DGD values. For a given average PMD, some of the MO devices may be controlled to switch the polarization coupling condition between two adjacent sections so that some of the crystals can either add or cancel their DGD values. Three different device configurations are described below by using the same 16 crystals to achieve different PMD dispersion profiles with different average PMD values.

Figure 3A:
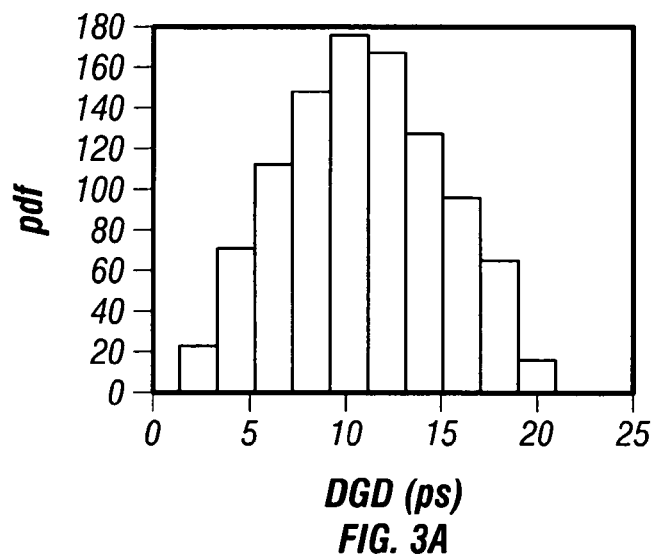
FIGS. 3A, 3B, 4A, 4B, 5A, and 5B show simulated PMD results for the emulator in FIG. 1.
Figure 3B:
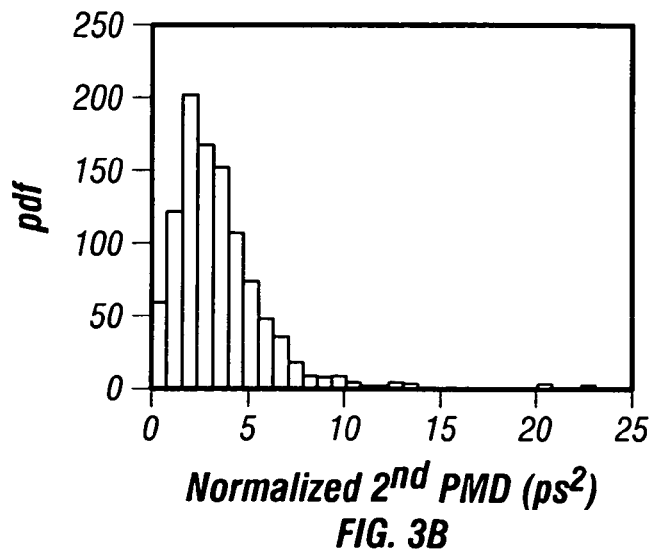

FIGS. 3A and 3B shows simulation results for a 10-ps average PMD with the following configuration for the MO devices:

1, 2, 4, 8, (16−16), 8, 4, (2+1+1), (−2+4−8−16+32), where MO devices between crystals within brackets ( )are controlled as polarization switches to form an effective single birefringent section, "+" represents the correspond MO device is set as a switch to align the slow and fast principal axes of the preceding section with the slow and fast principal axes of the succeeding section, respectively, and "−" represents the corresponding MO device is set as a switch to align the slow and fast principal axes of the preceding section with the fast and slow principal axes of the succeeding section, respectively. Hence, the above configuration is equivalent to a 8-section effective DGD emulator with the following 8 birefringent sections:

1, 2, 4, 8, 8, 4, 4, 10.

Figure 4A:
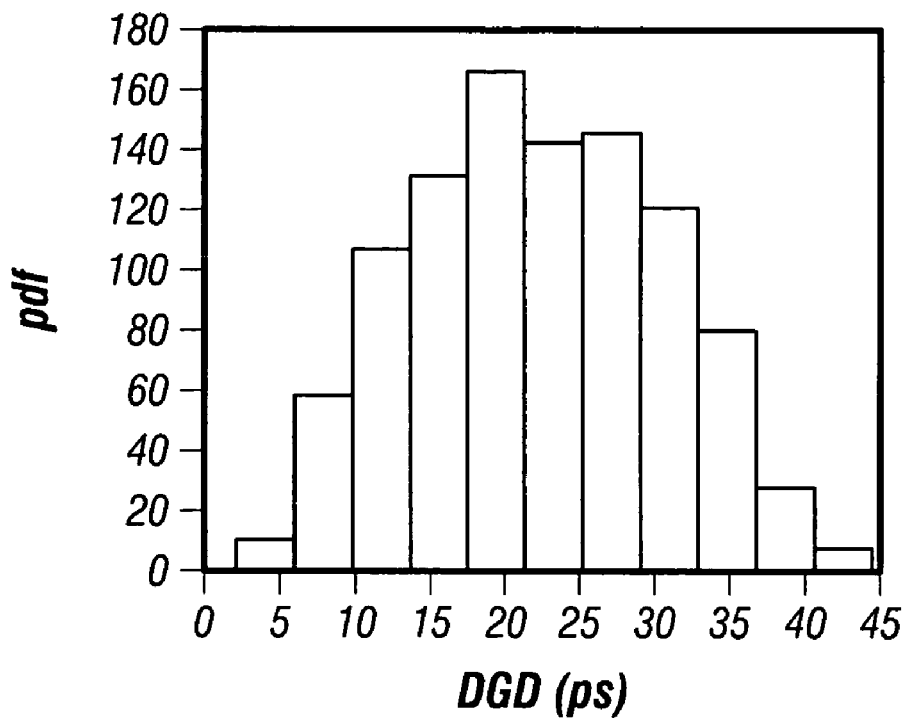
Figure 4B:
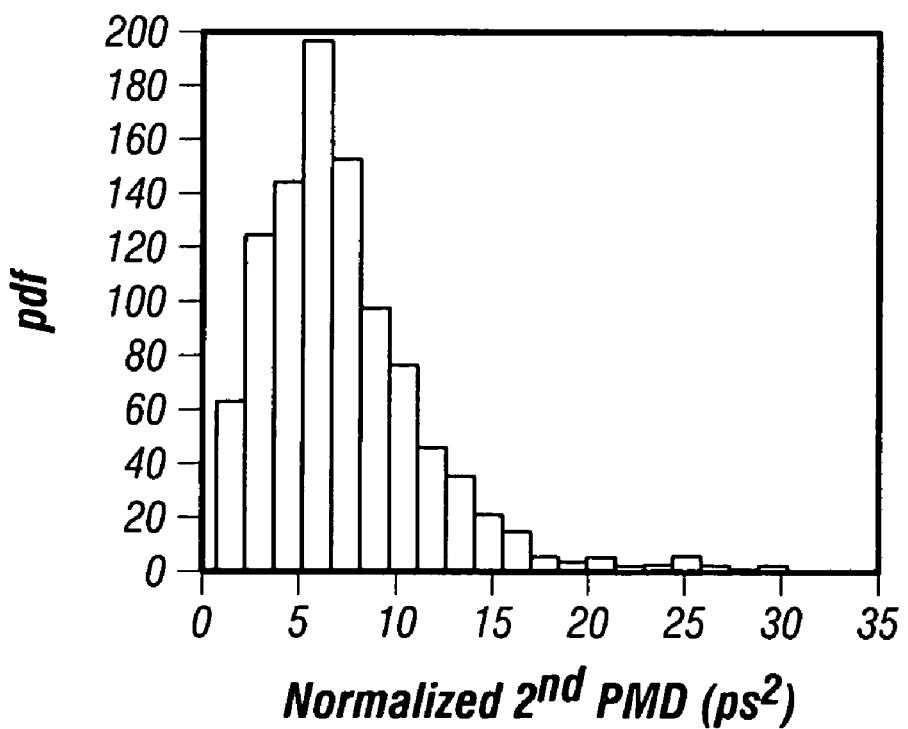

FIGS. 4A and 4B show simulation results of a 20-ps average PMD emulator with a different MO device configuration of (1+2+4), 8, 16, 16, (8+4), 2, (1+1+2), (4+8), (16−32)

to effectuate a 9-section DGD emulator:

7, 8, 16, 16, 12, 2, 4, 12, 16.

Figure 5A:
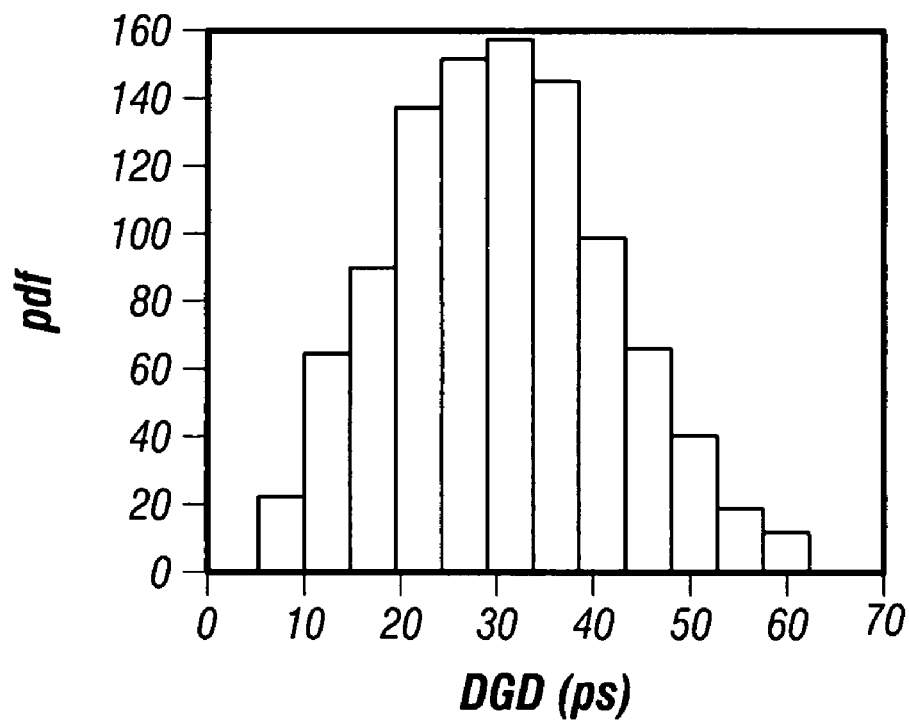
Figure 5B:
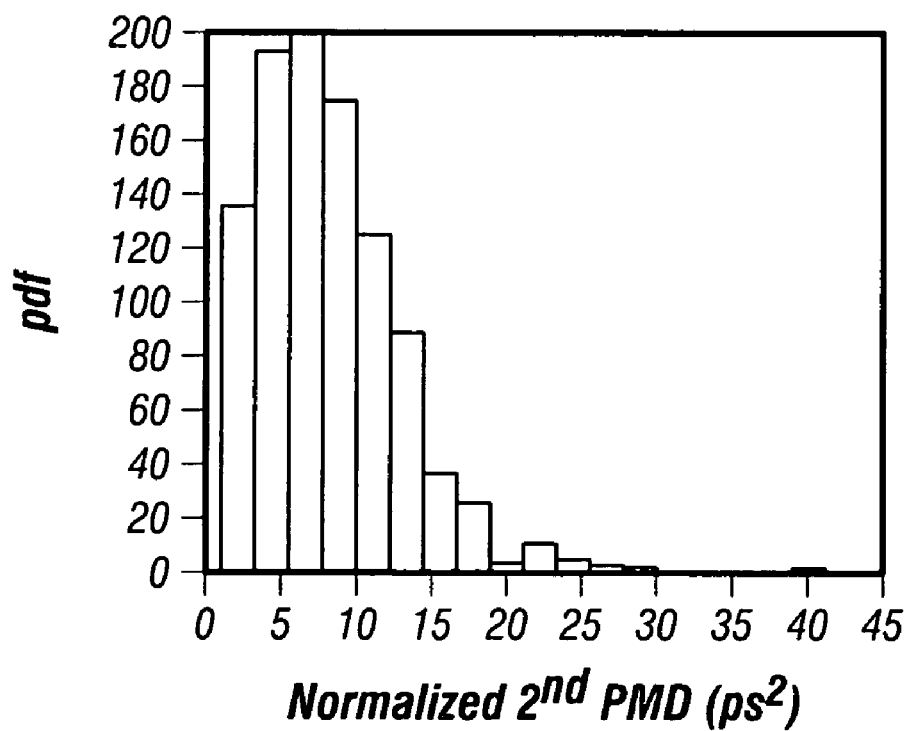

FIGS. 5A and 5B show simulation results of a 30-ps average PMD emulator with the following MO device configuration of (1+2), (4−8−16), 16, 8, (4+2+1+1), (2+4+8), 16, 32.

The corresponding effective 8-section DGD emulator has a section configuration of 3, 20, 16, 8, 8, 14, 16, 32.

A number of advantages of the design shown in FIG. 1 is now evident from the above examples. For example, such PMD emulators have no moving parts and provides a simple and compact design which can be manufactured at a relatively low cost; it can provide not only first-order DGD emulation but also all-order PMD effects that are more close to the real fiber statistics; the average PMD can be tuned by switching some of the MO rotators with simple electronic controls; any one of the emulated PMD profiles can be repetitively achieved within a given environmental condition; and the average PMD value can be changed.

In addition to PMD emulation, the device in FIG. 1 may be used at an optical receiving terminal as a higher-order PMD compensator by using either a feedback or feedforward control mechanism for controlling the rotators between DGD sections.

Figure 6:
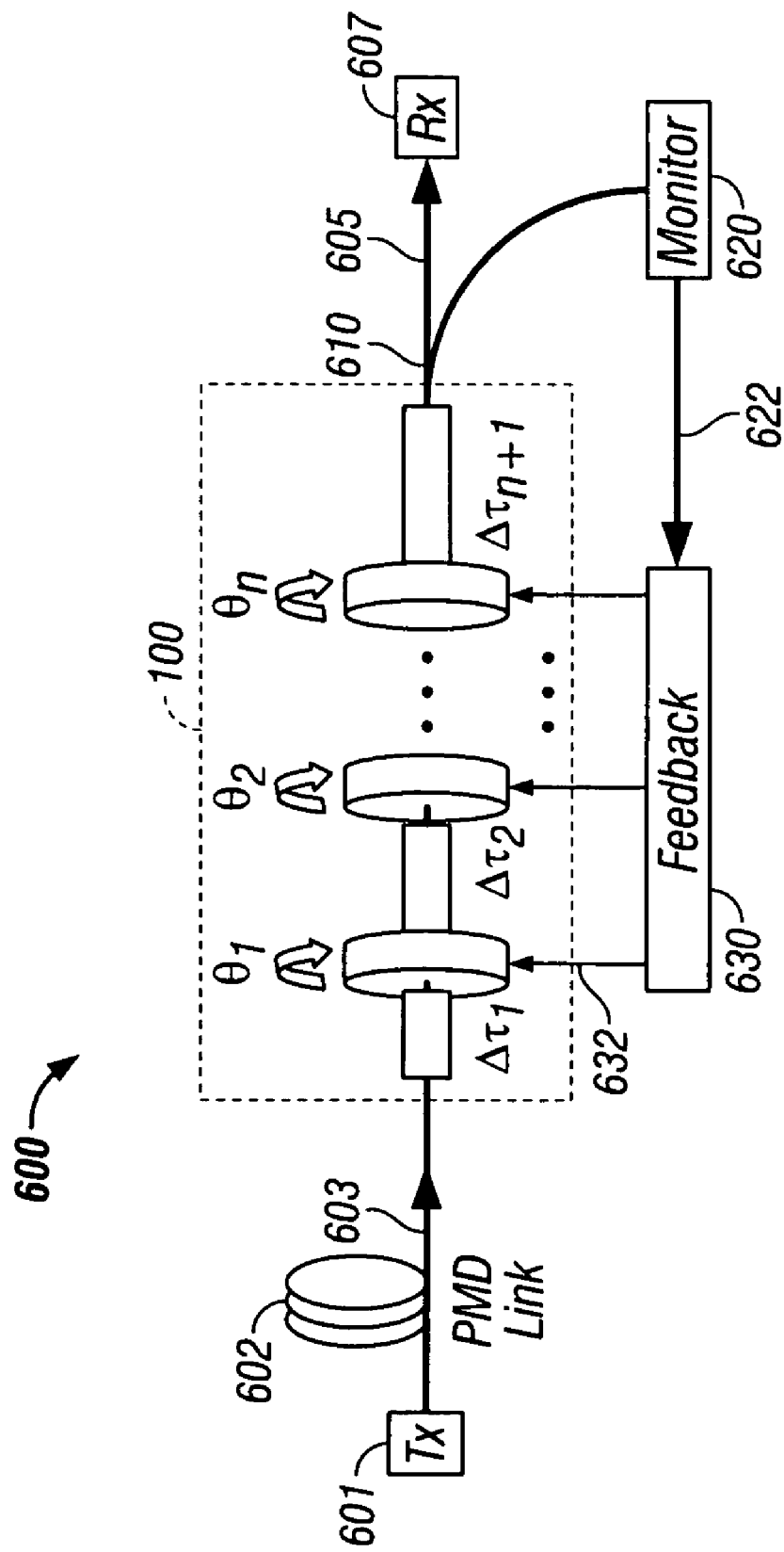
FIGS. 6, 7, and 8 show exemplary PMD compensating systems.

FIG. 6 illustrates a use of the device 100 in FIG. 1 as a PMD compensator in a fiber system 600 based on a feedback control. An optical transmitter 601 produces an output signal 603 for transmission in a PMD fiber link 602. At the receiving terminal, the device 100 is coupled before an optical receiver 607 to compensate for the PMD in the received signal 603 to produce a PMD-compensated signal 605 for the receiver 607. An optical splitter 610, such as a fiber coupler, may be used to split a fraction of the output 605 to a polarization detection module 620 which measures the polarization of the light 605. The output 622 of the module 620 is fed into a feedback control 630 for controlling the device 100 to compensate for the PMD in the signal 603. The feedback control 603, in response to the signal 622, produces a control signal 632, which may include control signals for the rotators 120 within the device 100, to control the device 100 so that the PMD produced by the device 100 negates the PMD in the received light 603.

The above feedback control is reactive in nature and does not have or does not respond to information on the input polarization received by the device. It controls the polarization rotators 120 in the device 100 based on the output polarization to correct the error in the output polarization. It is recognized that this may cause certain elements in the device to be out of its operating range and thus requires reset an out-of-range element such as a rotator 120 back to its normal operating range. This resetting is slow and reduces the speed of the feedback control.

Figure 7:
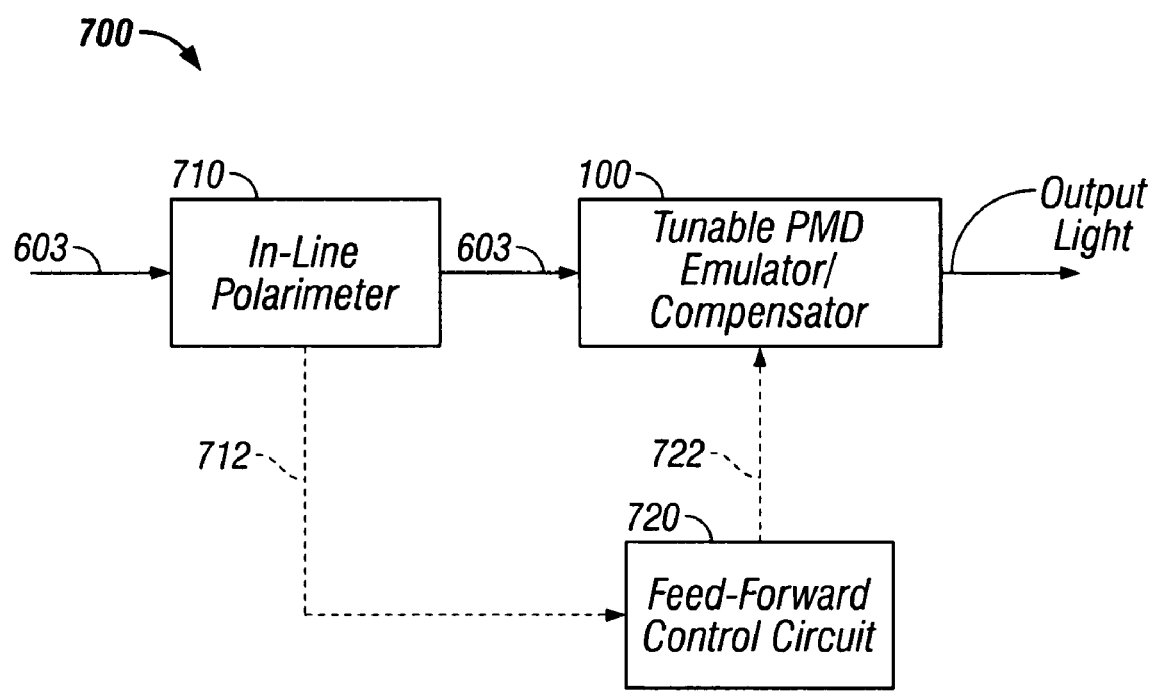

FIG. 7 shows a fiber system 700 that implements the device 100 in FIG. 1 as a PMD compensator based on an alternative feed-forward control. The feed-forward control includes an input polarization detection module 710 and a feed-forward control circuit 720. The polarization detection module 710 measures the state of the input polarization of the input optical signal 603. This module 710 may be an in-line polarimeter which transmits a received optical signal and measures its polarization at the same time without altering the input polarization. Alternatively, the module 710 may be a polarimeter that destroys the polarization upon measuring the polarization. Such a polarimeter may be coupled in the system out of the main optical path to receive a fraction of the input signal 603 by using an optical coupler or splitter in the path of the input beam 603 to tap the input signal 603 so that the majority of the input signal 603 continues to propagate to the PMD compensator 100. The module 710 produces an electrical output signal 712 that indicates the state of input polarization of the input 603. The circuit 720 responds to the signal 712 to set the polarization elements in the device 100 so that the PMD produced by the device 100 negates the measured PMD in the input light 603. The feed-forward control circuit 720 may include a lock-up table to store all possible settings for the elements in side the device 100 for all possible PMD profiles in the input light 603. Hence, the circuit 720 does not need to perform complex computation and can quickly respond to the measurement in the signal 712.

Figure 8:
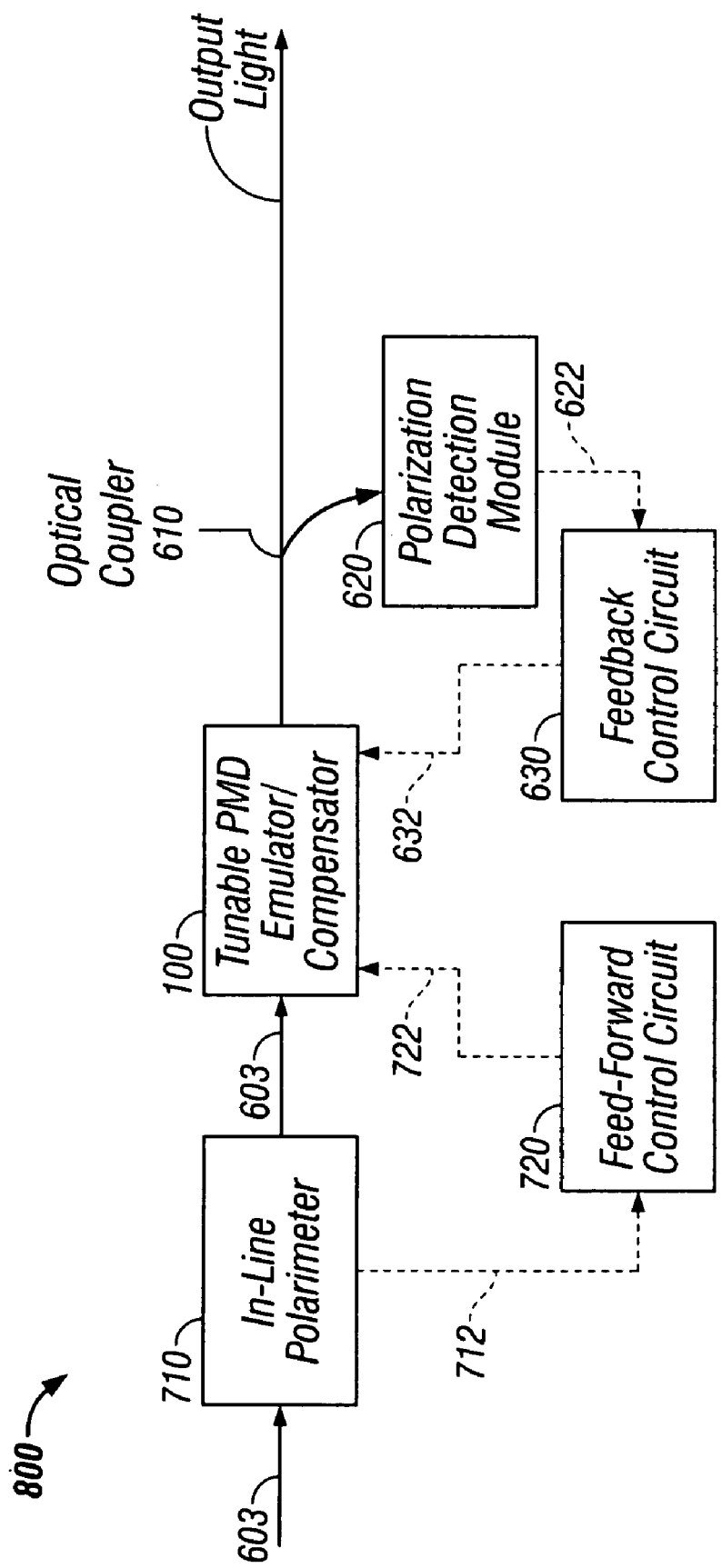

FIG. 8 further shows a fiber system 800 that uses both feedback and feed-forward controls in combination. The presence of both the feed-forward control and the feedback control allows the two controls to complement each other to provide a more efficient PMD compensation. For example, the feed-forward control can provide a coarse PMD compensating mechanism for setting the polarization elements in the device 100. Since the feed-forward control does not know whether the final PMD of the output signal, the feedback control can provides an additional finer PMD compensation based on the measurement on the output light to finely tune the polarization elements in the device 100 to further reduce the PMD.

Other applications of the device 100 in FIG. 1 may also be possible, such as investigation of PMD effects on high data rate digital fiber transmission systems, dynamic conditions in optical networks, and RF signal transmission.

Figure 9:
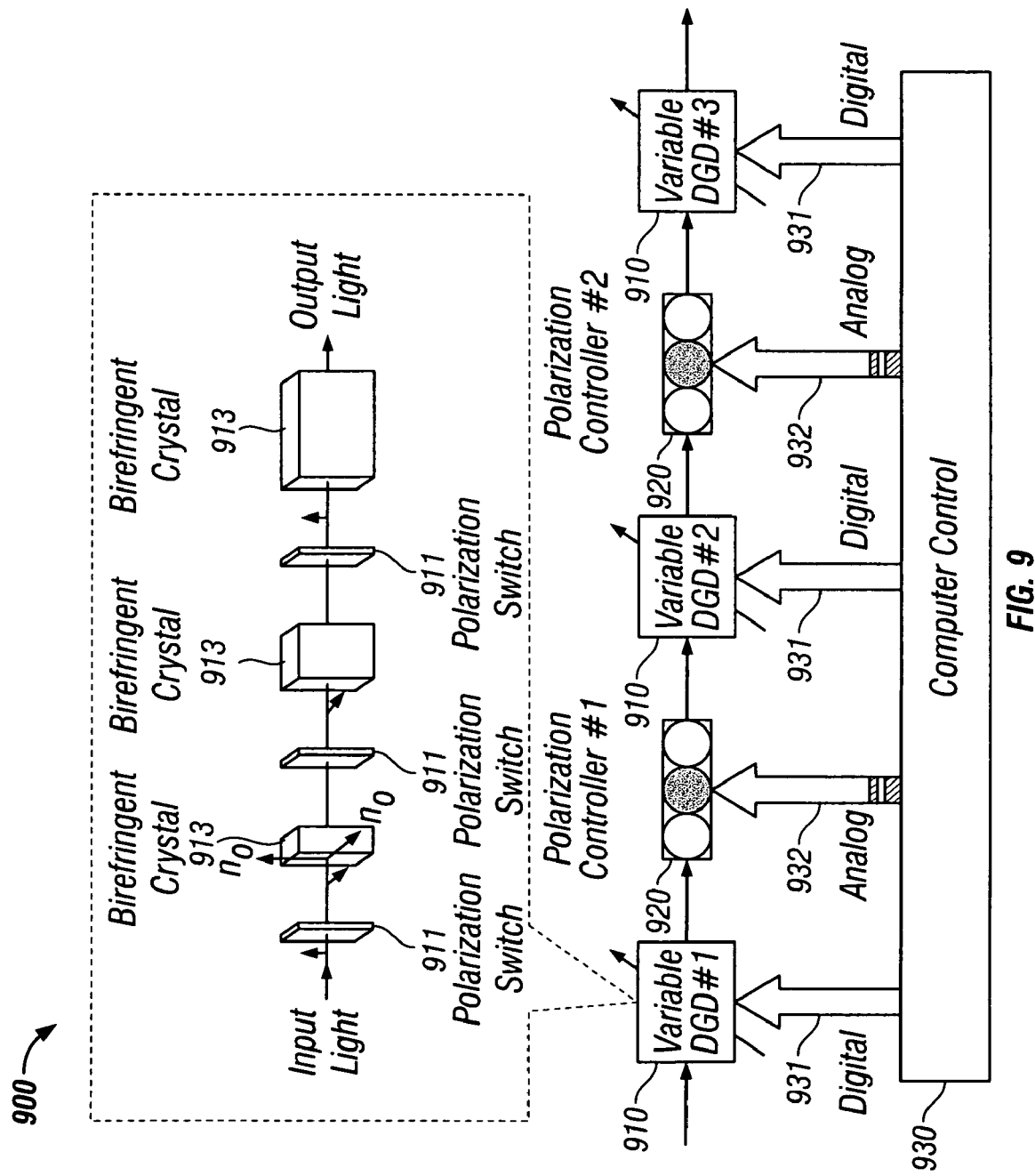
FIG. 9 shows another implementation of a PMD emulator.

FIG. 9 shows one implementation of a tunable PMD emulator 900 that uses multiple birefringent sections 910 with variable DGD values that can be adjusted in response to control signals 931. At least three sections 910 are needed to emulate all possible PMD profiles in a real fiber. A polarization controller 920 is coupled between two adjacent sections 910. Different from a polarization rotator which can only rotate the polarization of received light in a plane, the polarization controller 920 can control and manipulate the input polarization to produce an output polarization at any position on the Poincaré sphere, i.e., a 3-dimensional control of the polarization. A control unit 930, such as a microprocessor-based control unit, may be used to produce the control signals 931 for the variable sections 910 and the control signals 932 for the polarization controllers 920. This combination of variable DGD values in sections 910 and the polarization controllers 920 provides high-speed, stable, and repeatable PMD emulation with tunable PMD profiles and tunable average PMD values.

Each variable DGD section or element 910 may be implemented, e.g., by cascading multiple birefringent segments of different lengths in an optical path, and using tunable optical rotators to couple adjacent birefringent segments. As the optical rotators are controlled to rotate the optical polarization of light, the DGD value of the light passing through the optical path changes. Additionally, an additional control electrical field may be applied to one or more birefringent segments to change the indices based on the electro-optic effect to fine tune the total DGD value. In one implementation, the lengths of the birefringent segments within each variable DGD section 910 may differ between any two segments by a factor of $2^N$, where N=1, 2, 3, etc. This distribution of the segment lengths can reduce the number of polarization rotators needed. Exemplary implementations of such a variable DGD section 910 are described in U.S. Pat. No. 5,978,125 to Yao where the birefringent segments successively increase or decrease their lengths by a factor of 2 between two adjacent segments along the optical path. In another implementation as illustrated in the insert in FIG. 9, electrically-driven polarization switches may also be used to connect adjacent birefringent segments within each section 910.

The sections 910 may be digitally programmed via the control signals 931 to generate any DGD value, e.g., from −45 ps to +45 ps with a high tuning speed, e.g., less than 1 ms and a fine resolution of, e.g., 1.40 ps. The control unit 930 may be designed to control the emulator 900 to randomly generate any desired DGD distribution. The polarization controllers 920 may be implemented by, e.g., fiber-squeezer-based polarization controllers where each polarization controller includes 3 or more fiber squeezers engaged at different locations of a fiber to squeeze the fiber along two different directions. See, e.g., U.S. Pat. No. 6,493,474 to Yao where 4 squeezers with two squeezing in a first direction and another two squeezing in a second direction with a 45-degree angle from the first direction. The polarization controllers 920 may be controlled to uniformly scatter the polarization between sections 910 over the Poincaré sphere. To obtain a Maxwellian DGD distribution at the emulator output, the DGD values of each section 910 are varied according to a Maxwellian distribution with average, $\Delta\tau$. This yields an average DGD of $3\frac{1}{2}(\Delta\tau)$ for the entire emulator and an average 2nd-order PMD distribution that approximately simulates the PMD of a real fiber.

Hence, the device 900 in FIG. 9 combines the tunable DGD distribution from the variable DGD sections 910 and the tuning of the polarization controllers 920 to achieve accurate, stable, and repeatable PMD statistics. The DGD distributions from different variable DGD sections 910 can be adjusted independent from one another. Different sets of settings for the sections 910 and polarization controllers 920 are used to produce a set of outputs to fit a desired PMD statistics.

Figure 10:
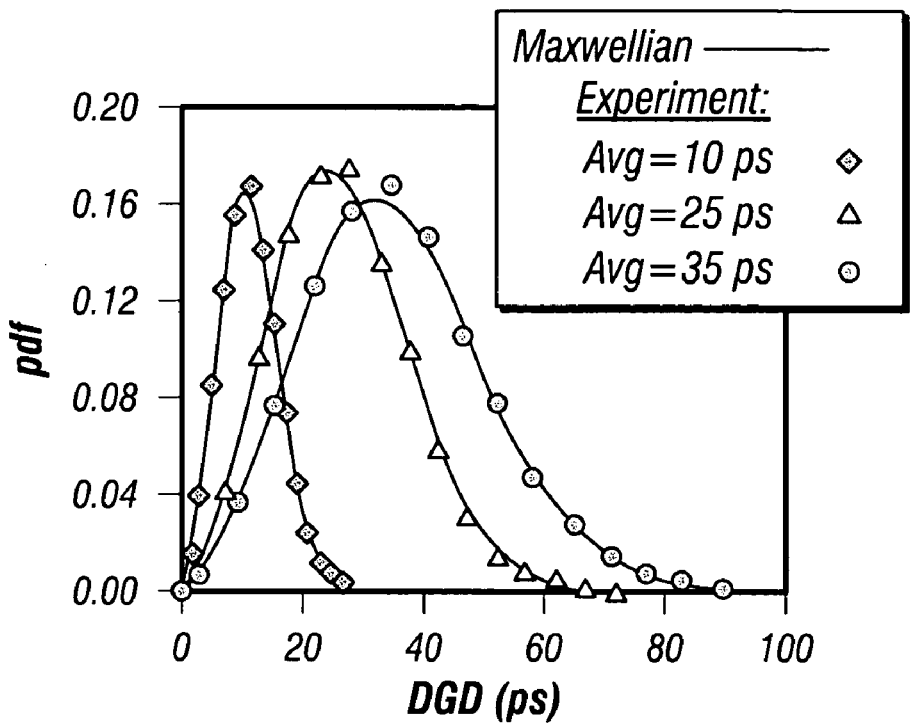
FIGS. 10 and 11 illustrate measured PMD outputs from the emulator in FIG. 9.
Figure 11:
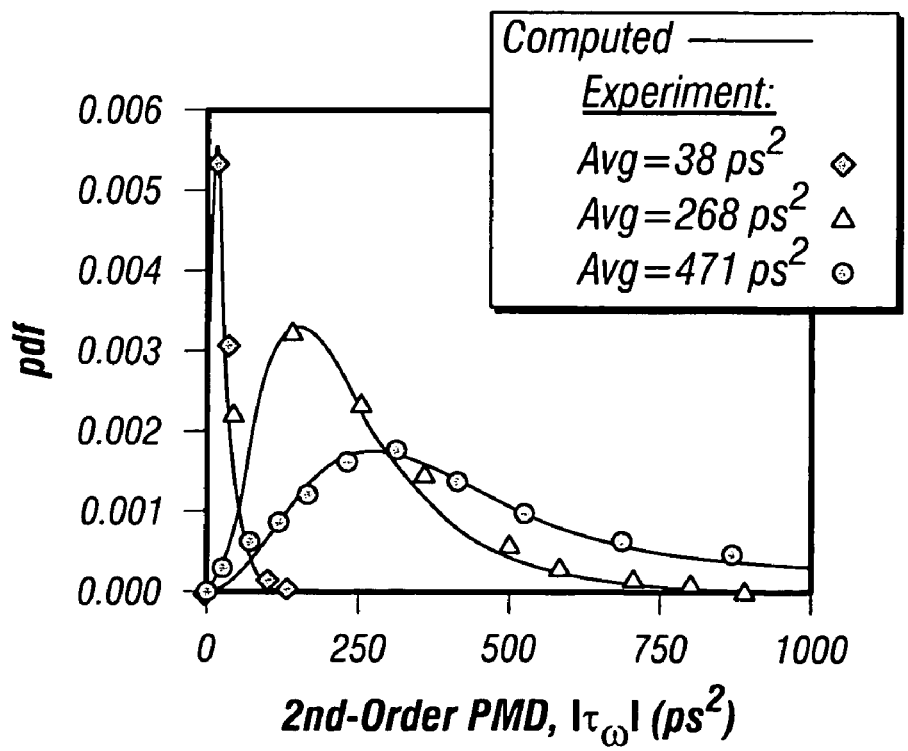

FIGS. 10 and 11 show Maxiwellian probability density function as a function of the DGD in ps and as a function of $2^{nd}$ order PMD in ps$^2$ from a sample emulator based on the design in FIG. 9 for three different distributions with <DGD>=10, 25 and 35 ps, respectively. The corresponding 2nd-order PMD distributions have averages of 38, 268, and 471 ps$^2$, which are approximately 30% lower than expected for a real fiber. All of the PMD measurements were performed using the Jones matrix method of a commercial PMD analyzer. Additional measurements of the sample emulator also show highly stable operation and repeatability with a variation in DGD less than about 5% and a variation in the $2^{nd}$ order PMD less than 10% for a period over 30 minutes. Hence, such an emulator may be used to generate a look-up table of control parameters and the corresponding DGD output values. The look-up table may be used to control the subsequent operations of the emulator.

Figure 12:
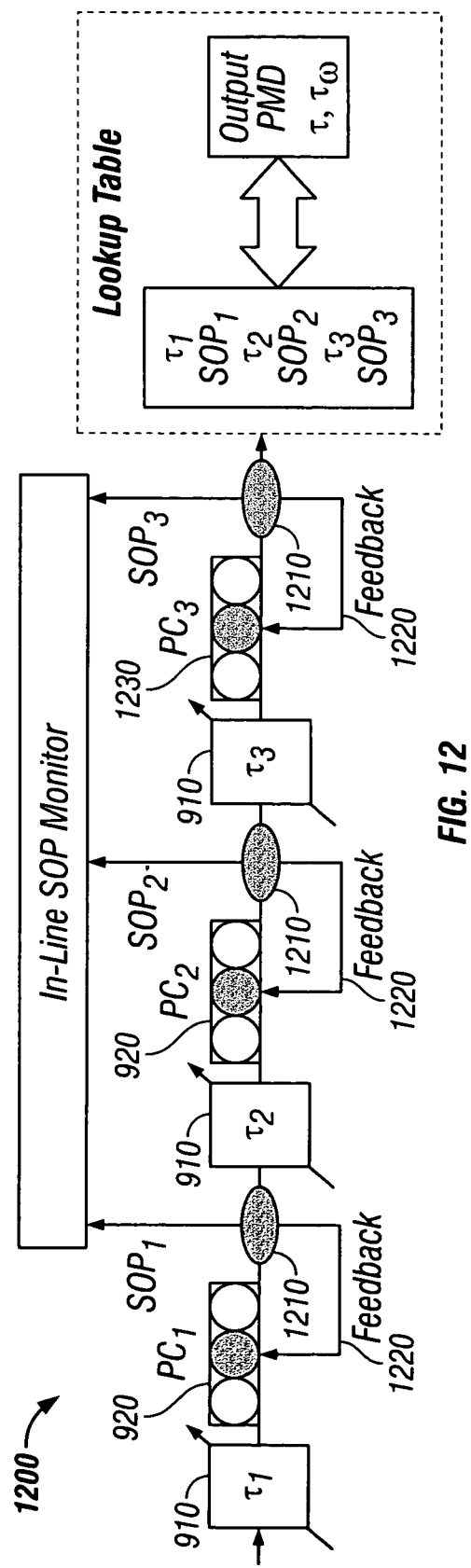
FIG. 12 shows a PMD emulator with a feedback control based on the design in FIG. 9.

FIG. 12 shows one implementation of a PMD emulator 1200 with a dynamic feedback control for each polarization rotator 920. Such a feedback control may be used to reduce or minimize any drift or variation in the output of the emulator caused by various factors including temperature variation, usually large temperature changes (more than a few degrees), and perturbation to the single-mode fiber pigtails between the sections. To accomplish this, in-line polarimeters 1210 are inserted after each section and a polarization controller 1230 and another in-line polarizmeter 1210 are added at the output of the emulator. The polarimeters 1210 are used to record the state of polarization (SOP) between sections for different emulator states. Since the DGD of each section can be known and in general is extremely stable (<0.1 ps/80° C.), the additional SOP information allows for construction of the lookup table of output first and second-order PMD vectors versus the input DGD values and SOP parameters. After recording the input and corresponding output parameters for each randomly-generated sample during a long system test, the operator can return to any previously recorded PMD state (e.g. one that caused high penalty) for further investigation by simply adjusting the DGD sections 910 and polarization controllers 920 to re-acquire the set of input values for that sample. Under a given set of settings for the variable DGD sections 910, the polarization controllers 920 are adjusted by the respective feedback controls 1220 to bring the output PMD to the previously-established PMD in the look-up table. Hence, even after environmental or polarization-coupling perturbations, this table may be used to re-acquire exactly a desired PMD state using automatic feedback control of the polarization controllers to obtain the needed SOP coupling.

Similar to the PMD device 100 in FIG. 1, the PMD emulators shown in FIGS. 9 and 12 may also be used as PMD compensators with the control mechanisms shown in FIGS. 6, 7, and 8. Notably, due to the high stability and accurate repeatability of the PMD emulators shown in FIGS. 9 and 12, it is now possible to use such emulators to emulate real PMD states based on the importance sampling (SI) technique without requiring deterministic control of the polarization coupling between sections. This feature is described in the following sections.

It is known that the fiber birefringence varies randomly with time and the optical frequency. Such variations cause the PMD of the fiber to be a statistical parameter. The instantaneous PMD of a fiber is characterized by a vector, $\tau$, whose direction determines the fiber's two principle states of polarization and whose magnitude is the differential-group-delay (DGD). The DGD generally follows a Maxwellian distribution that falls off to low probabilities at about 3 times the average value and extends out to infinity. It is the occasional events in the tail of the distribution that are likely to cause system outages.

Some fiber communication systems typically require PMD-based system outages (penalty >1 dB) occur with a probability of $10^{-6}$ or less (<1 min/yr). To assess the effects of PMD on a system, both with and without compensation, PMD emulators are used to cycle through different PMD states. However, it can be difficult to characterize system outage probabilities using previously reported PMD emulators, or even with computer simulations, because of the extremely large number of randomly generated PMD states that must be explored to obtain a reliable estimate.

Importance sampling (IS) technique is a powerful tool for obtaining very low probability events with relatively few sample points. This is accomplished by altering the method of obtaining the random samples to concentrate the measured results in the area of interest in the sample space. This can distort the probability distribution of the measured results, so each sample must then be appropriately weighted to map the measured values back onto the proper distribution function.

Importance sampling techniques for PMD emulation have been accomplished using computer simulations. This is because a critical drawback of previously reported PMD emulators is that they do not possess the programmability, or stability, required to perform IS. These emulators are typically constructed with multiple fixed-DGD elements such as PM fibers or birefringent crystals. Different PMD states are then obtained by randomly varying the polarization coupling between sections. To perform IS with these emulators requires deterministic control of the coupling angle between the PMD vectors of adjacent sections in order to preferentially align them to obtain rare PMD events. Such operations can be extremely difficult to accomplish at least because the environmental sensitivity of the birefringent elements causes the direction of the PMD vectors to drift over time (even if the DGD remains constant, small variations in the birefringence will cause large changes in the PMD vector's direction). Furthermore, even with highly stable elements, it would still be a significant challenge to determine the PMD vector between sections and accurately produce the desired coupling angles for each sample.

The use of the PMD emulators of this application allows for experimental importance sampling that bypasses these and other obstacles and can produce improved statistics without the need to determine and control the direction of the PMD vector between sections. The PMD emulators of this application shown in FIGS. 9 and 12 are designed with tunable, rather than static, DGD elements. As a result, the importance sampling can be accomplished by biasing the distribution of DGD values applied to each element, as opposed to controlling the coupling angles between sections. As such, only uniform scattering of the polarization coupling between sections is required, which is easily accomplished with electrically driven polarization controllers. This technique also overcomes a problem encountered with the previous methods in that, by preferentially aligning the PMD vectors to obtain large DGD values, the possible range of 2nd-order PMD states is severely limited, thereby distorting the 2nd-order statistics. Thus, using a 3-section emulator with programmable DGD elements based on the design in FIG. 9, it is now possible to experimentally use importance sampling to efficiently obtain rare, Maxwellian distributed DGD events with probabilities as low as $10^{-24}$ (for <DGD>=15 ps) and correspondingly rare 2nd-order PMD events after taking only 1,000 samples. Multiple importance sampling techniques can also be used to combine the results from three different distributions to achieve better coverage of the entire sample space. The resulting distribution tail extends to $10^{-30}$.

Referring back to FIG. 9, the importance sampling may be implemented in connection with a microprocessor that is integrated to or coupled to the control unit 930. The microprocessor is programmed to carry out the operations for the importance sampling. Some of these operations are described in the following examples.

In measurements, the emulator 900 in FIG. 9 is controlled so that the variable DGD sections 910 can be digitally programmed to generate any of 32 DGD values between 0.7 to 45.65 ps in 1.4-ps steps, with a tuning speed of <1 ms. To generate a Maxwellian DGD distribution with an average of <τ> using conventional Monte-Carlo techniques, the DGD values applied to each section are Maxwellian distributed with an average of <τ>/(3½). The polarization controllers are randomly varied to uniformly scatter the polarization state over the Poincaré sphere between sections.

Figure 13:
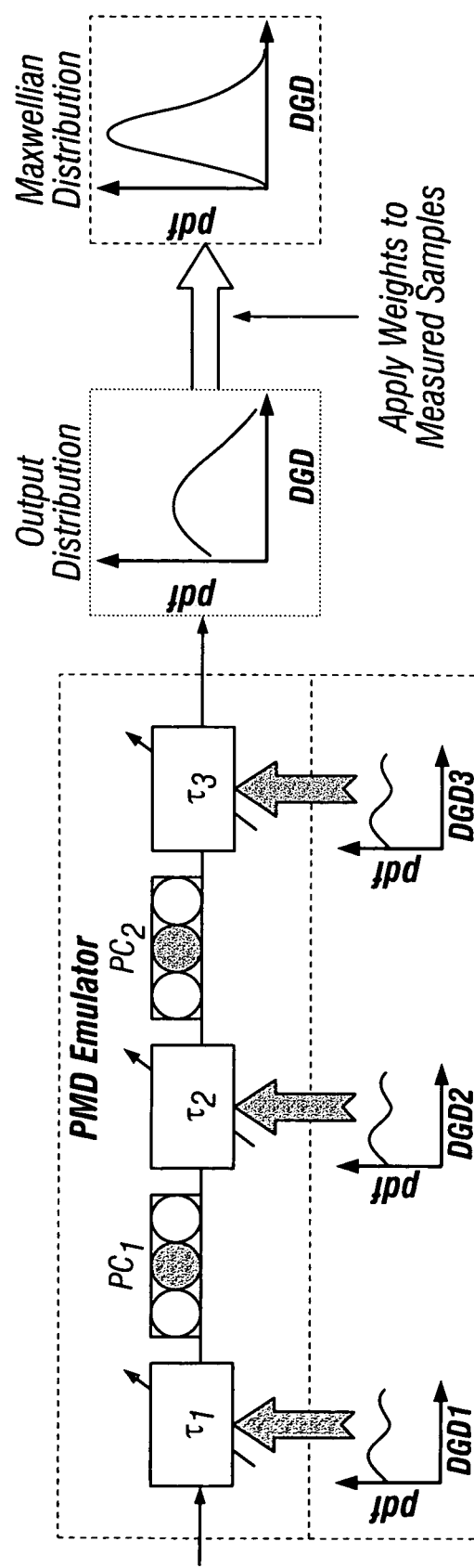
FIG. 13 illustrates importance sampling using a PMD emulator with three programmable DGD elements separated by two electrically-driven polarization controllers based on the design shown in FIG. 9, where the importance sampling is accomplished by applying a biased DGD distribution to each section (chosen to emphasize the region of interest) and then appropriately weighting the results to obtain the desired probability density function (pdf).

FIG. 13 illustrates the importance sampling technique. The programmability of the variable DGD sections are used to perform IS by applying randomly selected DGD values from a probability density function (pdf) other than a Maxwellian. Any pdf may be used, but the best choices are those that will tend to generate more output samples in the region of interest with the fewest possible measurements. In performed measurements, a uniform distribution of DGD values to each element is applied over their full 45 ps range.

The DGD applied to each DGD section and the corresponding output DGD and 2nd-order PMD are recorded for each sample. As expected, the measured output values do not follow the desired Maxwellian distribution and should be properly weighted to adjust their probabilities to match the desired Maxwellian statistics. For each DGD section, let p(xi) be the probability of obtaining DGD xi using the desired Maxwellian pdf with <DGD>=<τ>/(3½)) and p*(xi) be the probability using the uniform pdf. For each sample, i, three likelihood ratios, p(xi)/p*(xi), are computed using the three applied DGD values for the xi's. The three ratios are then multiplied together and divided by the total number of samples to determine the "weight" for each sample. The output DGD values are then sorted, while keeping track of the corresponding weights. The DGDs and corresponding weights are grouped into DGD bins and the weights in each bin are summed to obtain the probability for that bin. These probabilities are then plotted alongside a Maxwellian, integrated over each bin, for comparison. Throughout the experiment, all PMD measurements were performed using the Jones Matrix method of a commercial PMD analyzer.

Figure 14A:
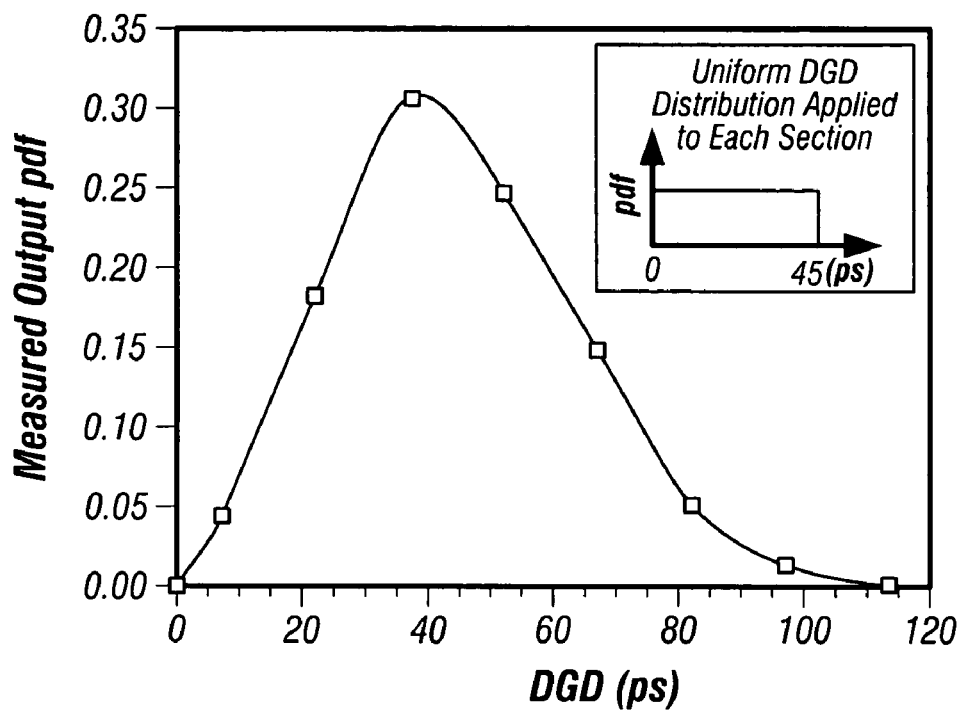
Figure 14B:
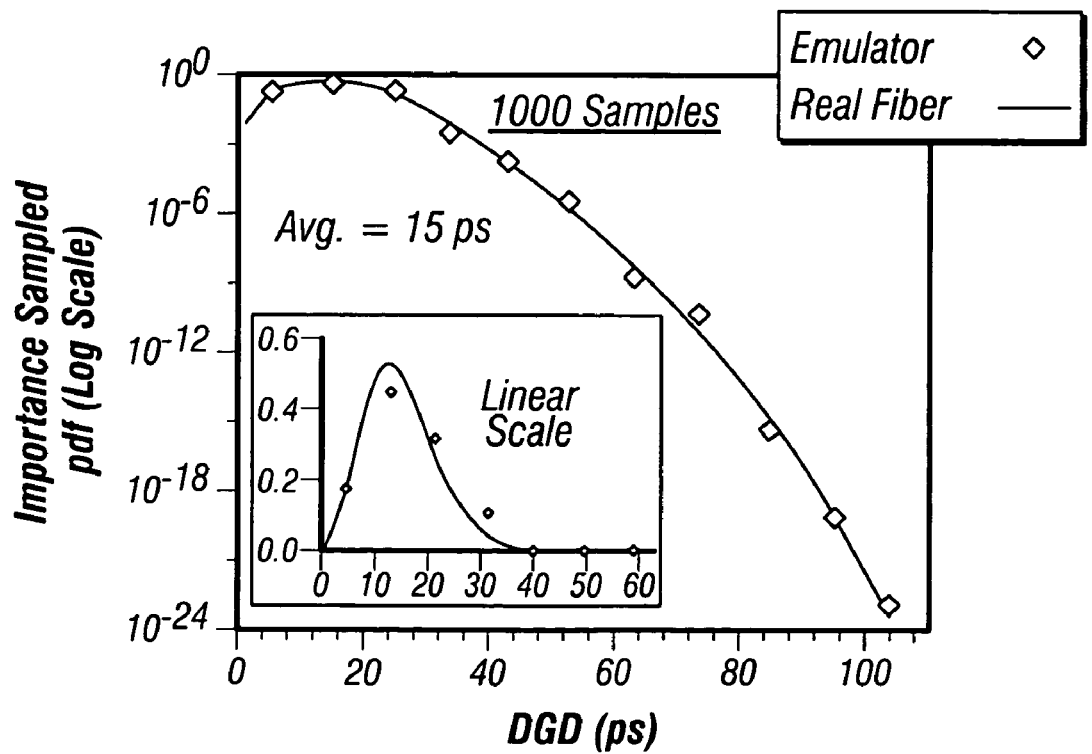
Figure 15A:
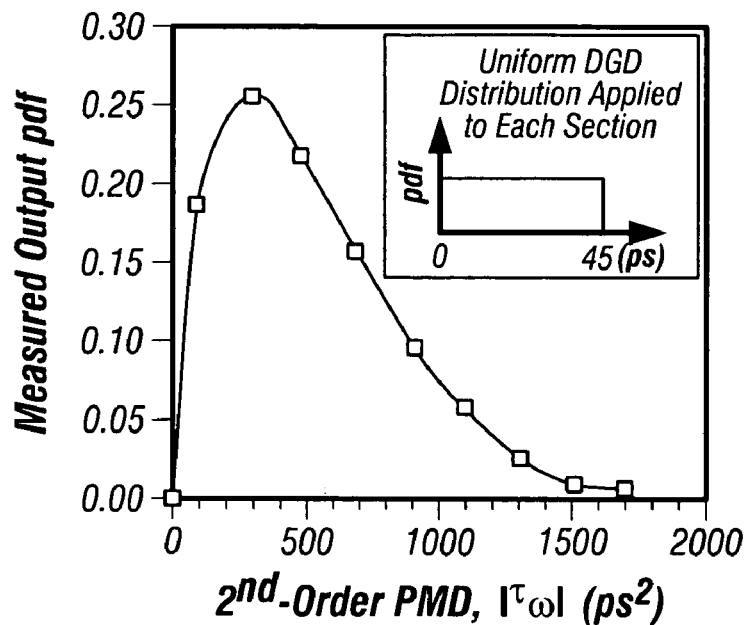
Figure 15B:
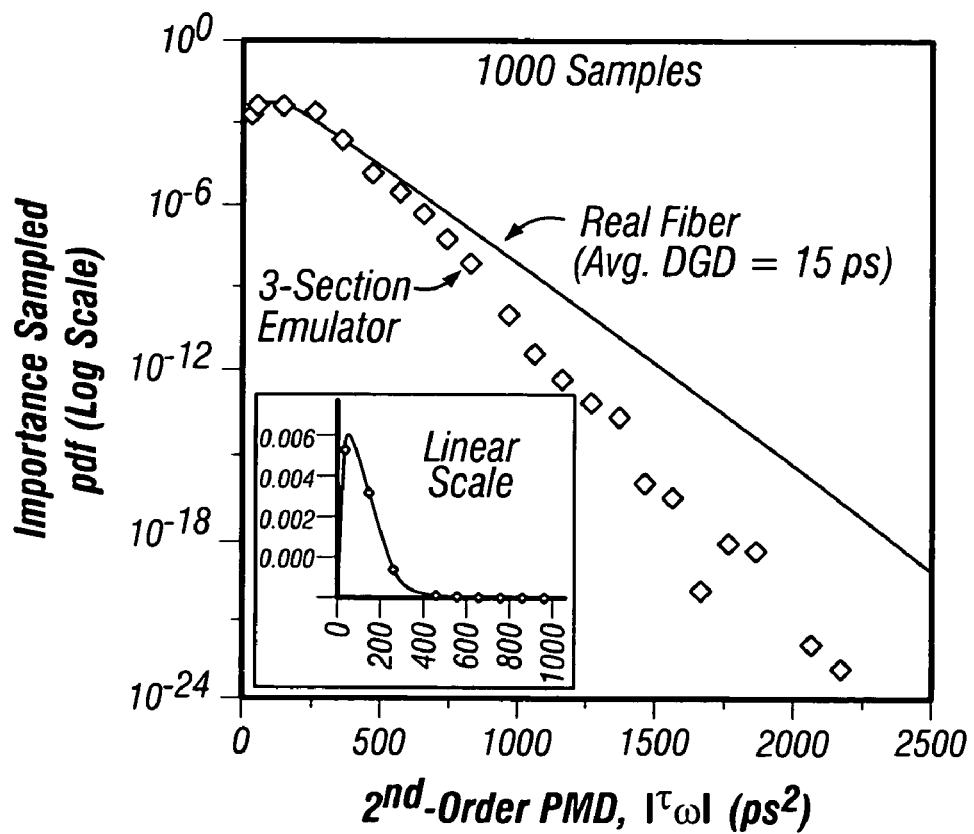

The resulting DGD and 2nd-order PMD probability distributions when 1000 uniformly distributed DGDs are applied to the three sections are shown in FIGS. 14A, 14B, 15A and 15B. FIGS. 14A and 15A show the distributions of the unprocessed, measured values. Clearly, several large DGD and 2nd-order PMD values result relative to the unbiased case. In FIGS. 14B and 15B, the measured samples have been renormalized as described above, where p(xi) is a Maxwellian distribution with <τ>=8.7 ps/section. As expected, the experimental points for the total DGD closely approximate a Maxwellian with <τ>=3½(8.7)=15 ps are rare events down to $10^{-24}$ are obtained, whereas conventional sampling would only reach $10^{-3}$ probabilities with 1000 trials. The experimental 2nd-order PMD pdf in FIG. 15B has the correct shape, but falls short of the theoretical pdf for a real fiber because only three sections are used. However, it is notable that large 2nd-order PMD values are obtained with this method.

Figure 16A:
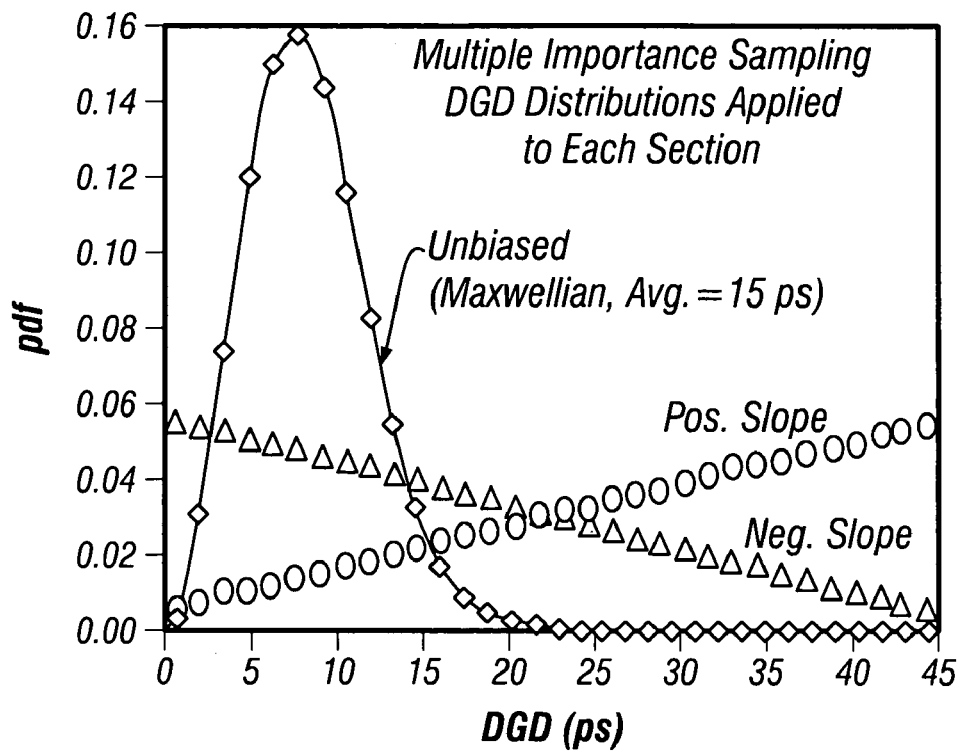
Figure 16B:
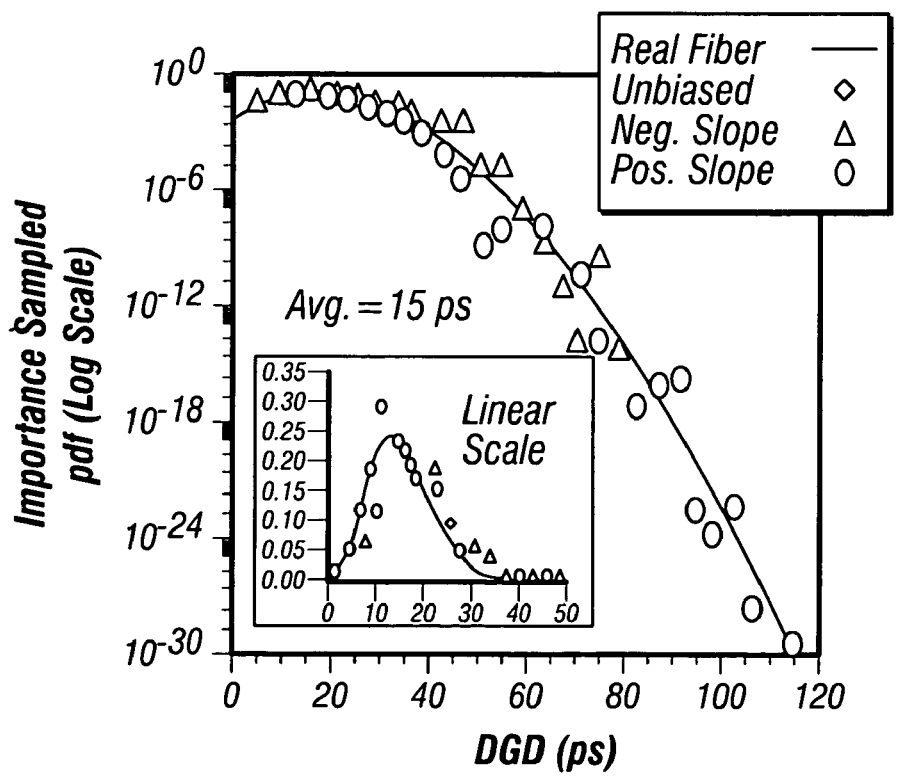
Figure 16C:
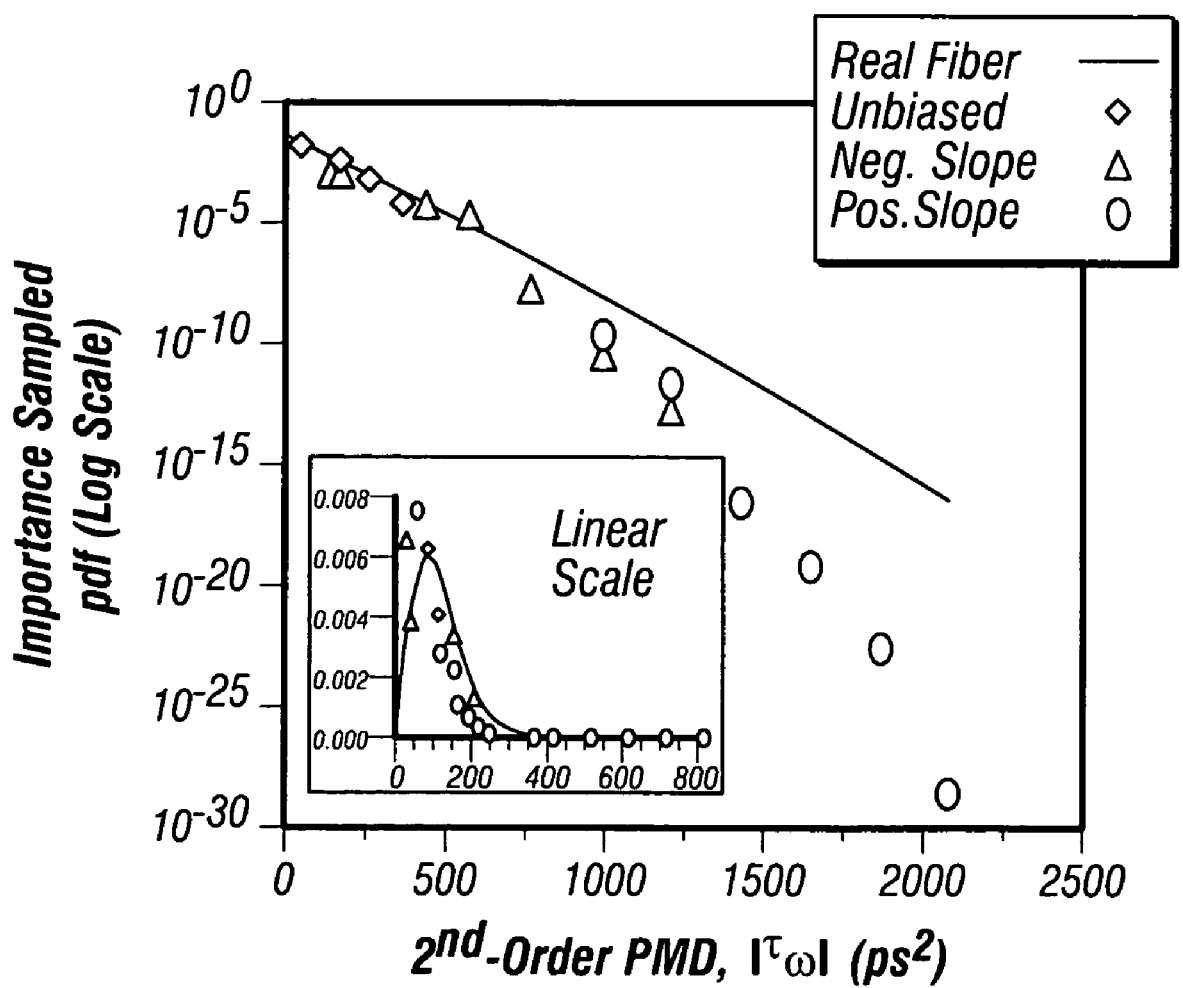

To efficiently obtain PMD events covering the entire range from low to high values, a technique of "multiple importance sampling" is also used to combine the results of several experiments using different DGD pdfs applied to each section. Referring to FIG. 16A, an unbiased, Maxwellian pdf was used to obtain several values in the low-DGD region, a negatively sloped linear pdf was used to obtain low to medium DGDs and a positively sloped pdf was used to obtain high DGDs. 840 samples were taken for each distribution. The experimental results are weighted to obtain the distributions shown in FIGS. 16B and 16C. The multiple IS technique provides better coverage of the entire sample space. The resulting distribution tail extends to $10^{-30}$.

Only a few implementations are disclosed. However, it is understood that variations and enhancements may be made without departing from the spirit of and are intended to be encompassed by the following claims.

What is claimed is:

1. A device, comprising:
   a plurality of variable DGD (differential group delay) sections cascaded in series to form an optical path, each variable DGD section operable to produce a variable differential group delay and configured to comprise:
   a plurality of cascaded birefringent segments of different lengths, and
   a plurality of tunable polarization elements each coupled between two adjacent birefringent segments to control polarization of light;
   a plurality of polarization controllers each coupled between two adjacent variable DGD sections to control polarization of light transmitting therethrough; and
   a control unit coupled to said variable DGD sections to apply DGD control signals to respectively control DGD values of said variable DGD sections and coupled to said polarization controllers to apply polarization controller signals to control polarization coupling between two adjacent DGD sections to produce a polarization-mode dispersion profile in light transmitting through said optical path.

2. The device as in claim 1, further comprising:
   an in-line polarization monitor coupled between each polarization controller and an immediate adjacent variable DGD section to measure a state of polarization of output light from said each polarization controller; and
   a feedback control loop coupled between said in-line polarization monitor and said each polarization controller to stabilize output light at a desired state of polarization.

3. The device as in claim 1, wherein each tunable polarization element is a polarization rotator.

4. The device as in claim 1, wherein each tunable polarization element between a first birefringent segment and a second birefringent segment is a polarization switch which is responsive to a switch control signal to switch polarization of light between a first state where a first principal polarization of light along a slow principal axis and a second principal polarization of the light along a fast principal axis of said first birefringent segment are aligned with slow and fast principal axes of said second birefringent segment, respectively, and a second state where a first principal polarization of the light along a slow principal axis and a second principal polarization of the light along a fast principal axis of said first birefringent segment are aligned with fast and slow principal axes of said second birefringent segment, respectively.

5. The device as in claim 1, wherein said birefringent segments have lengths that are different from one another by at least a factor of 2.

6. The device as in claim 1, wherein each polarization controller includes a plurality of tunable fiber squeezers coupled to different positions along a fiber.

7. The device as in claim 1, wherein said control unit is configured to perform importance sampling for emulating PMD (polarization mode dispersion) states in a real fiber.

* * * * *